United States Patent
Svensson

[19]
[11] Patent Number: 5,836,633
[45] Date of Patent: Nov. 17, 1998

[54] GRIPPING ARRANGEMENT

[76] Inventor: Bo Karl Ragnar Svensson, Nybrogatan 75 114 40, Stockholm, Sweden

[21] Appl. No.: 817,041
[22] PCT Filed: Oct. 16, 1995
[86] PCT No.: PCT/SE95/01193
  § 371 Date: Mar. 19, 1997
  § 102(e) Date: Mar. 19, 1997
[87] PCT Pub. No.: WO96/12582
  PCT Pub. Date: May 3, 1996

[30]     Foreign Application Priority Data

Oct. 21, 1994 [SE] Sweden .................................. 94 03607

[51] Int. Cl.$^6$ ...................................................... B25J 15/08
[52] U.S. Cl. ........................... 294/88; 294/115; 294/902; 901/37; 901/39
[58] Field of Search ................. 294/88, 97, 106, 294/115, 118, 902; 414/739, 753; 901/31, 36, 37, 39

[56]         References Cited

U.S. PATENT DOCUMENTS

| | | |
|---|---|---|
| 1,274,685 | 8/1918 | Cline . |
| 1,392,678 | 10/1921 | Buhr . |
| 1,646,938 | 10/1927 | Steiger ................................. 294/115 X |
| 2,381,657 | 8/1945 | Eksergian et al. . |
| 2,457,909 | 1/1949 | McKay et al. . |
| 2,573,403 | 10/1951 | Church . |
| 2,845,275 | 7/1958 | Skillin . |
| 3,085,814 | 4/1963 | Scott . |
| 3,386,297 | 6/1968 | Willis ...................................... 294/88 X |
| 3,512,824 | 5/1970 | Bautz et al. ............................. 294/115 |
| 3,981,673 | 9/1976 | Sokolow . |
| 4,540,211 | 9/1985 | Masserang ........................... 294/115 X |
| 4,733,895 | 3/1988 | Hawkes ...................................... 294/88 |
| 4,784,422 | 11/1988 | Jones et al. . |
| 5,280,981 | 1/1994 | Schultz . |

FOREIGN PATENT DOCUMENTS

| | | |
|---|---|---|
| 0 218 756 | 4/1987 | European Pat. Off. . |
| 34 20857 | 12/1985 | Germany . |
| 3522983 | 1/1986 | Germany . |
| 43 20071 | 1/1994 | Germany . |
| 9200096 | 7/1993 | Sweden . |
| 966644 | 8/1964 | United Kingdom . |
| 2 048 212 | 12/1980 | United Kingdom . |

*Primary Examiner*—Johnny D. Cherry
*Attorney, Agent, or Firm*—Burns, Doane, Swecker & Mathis, L.L.P.

[57]         ABSTRACT

The invention relates to an arrangement (6) which functions to grip and hold, or release, material (3) with the aid of a number of movable gripping devices (51, 52). A part (57c) which is intended for coaction with the gripping device (51) has a first supportive surface (57g) and a first through-penetrating hole (57h), and the gripping device includes a narrowed part (51a) which, among other things, provides a second supportive surface (51b) which can face towards the first supportive surface (57g). The two supportive surfaces are adapted to abut one another. The gripping device also has a second through-penetrating hole. The centre line (71, 71') of the two holes can be coordinated for common coaction of the holes with a screw (72).

26 Claims, 3 Drawing Sheets

GRIPPING ARRANGEMENT

TECHNICAL FIELD

The present invention relates to a gripping arrangement which functions to grip and hold or release material with the aid of a number of movable gripping devices, and relates more particularly to such arrangements which include a centrally positioned and axially extending main cart which is adapted to carry a piston-cylinder device which is movable reciprocatingly in relation to said main Dart and whose axial movement can be translated to radial movement of said gripping devices through the medium of a lever means.

The arrangement according to the present invention utilizes a lever means belonging to each gripping device where the lever means is pivotal in relation to the main part and includes a part which coacts with the piston-cylinder device and a part which coacts with the gripping device.

Arrangements of this kind are used to a large extent in program controlled machine tools, such as CNC lathes and CNC multi-operation machines, although the invention is not restricted to this technical field.

When applying the present invention, the proposed arrangement is intended to grip and hold raw material and move the material into coaction with a chuck, whereafter the raw material is machined with the aid of tool sets, and thereafter grip and hold the machined workpiece and withdraw the same from the chuck.

Alternatively, the arrangement can also or solely be used as a rod feed unit, from a chuck or the like.

The arrangement is also designed so that it is able to release its gripping and holding coaction with the material by moving the gripping devices in the reverse direction.

DESCRIPTION OF THE BACKGROUND ART

Several designs of arrangements of this kind are known to the art, and can possibly be classified as falling within either one of two different structural and functional principles.

One constructional principle is to guide the gripping devices or the clamping jaws in channels to obtain purely radial movement of said devices or said jaws, as in the case of a chuck.

Reference is made to the following publications with regard to this constructional principle:

U.S. Pat. No. 1.392,678

U.S. Pat. No. 2,457,909

U.S. Pat. No. 2,573,403

U.S. Pat. No. 2,845,275; and

U.S. Pat. No. 3,085,814.

Another constructional principle is to mount the gripping devices or the clamping jaws for pivotal movement about a pivot axis or axle, with the gripping surfaces of the gripping devices or clamping jaws moving in a radial although circular-arcuate path.

Examples of earlier known arrangements of this latter kind are found in:

EP-AS 0 218 756

U.S. Pat. No. 2,381,657; and

GB-C 966 644.

It is also known in the case of arrangements of this kind for said main part to carry a piston-cylinder device which is movable reciprocatingly in relation to said main part and whose axial movement is translated into radial movement of the gripping surfaces belonging to said gripping devices, through the medium of a number of lever means, such as two-arm lever means.

It is also known to activate the piston-cylinder device with the aid of the pressure of a coolant supply used normally to cool material and tools in a machining operation, such as to be able to move the piston-cylinder device to a gripping and holding position, and to cause the piston-cylinder device to return to a starting position upon cessation of the pressure with the aid of spring means, so as to open the gripping devices and therewith enable the workpiece to be removed therefrom.

It is also known to activate the piston-cylinder device with the aid of other hydraulic media or Faith the aid of a pneumatic arrangement.

The present invention is intended for use with both of the aforesaid construction principles, although the inventive principle is more beneficial with regard to those construction principles in which the gripping devices are each movable about an individual rotational axis, such that said gripping surfaces will move radially in a circular-arcuate path around the central axis of rotation.

As further examples of prior art, pertaining to the present invention, references are made to the following publications:

SE-A-92 00096-7

This publication describes an arrangement with three exchangeable or replaceable gripping devices. These gripping devices are attached to a fixed part through a pivot axle (4a) and the respective position of each gripping device is controlled through a coaction between a rounded partition (4b), belonging to the gripping device, and a recess (31) within a movable piston (3).

A method to dismount a gripping devices is to put the piston (3) in its fully rejected position, whereby the fixed part (5) is unscrewed and moved in a direction from the piston. This will bring the partition (4b) out of the recess (31) and a pin and screw, holding the gripping device to the part (5), can be loosened. A corresponding operation in the opposite order of sequence provides a way to mount a gripping device.

The driving mechanism used here comprises a piston-cylinder-arrangement, where the axial movement of the piston (3) is translated into a radial movement of the gripping devices. This is performed through the attachment of the gripping devices to the fixed part (5), by means of the pivot axle (4a), and the coaction between the rounded partition (4b) and the recess (31), belonging to the piston (3), whereby the rounded partition can follow the movement of the piston.

The fixed part (5) must be loosened from the arrangement in order to make it possible to loosen the screws, holding the gripping devices, and to thereby make it possible to exchange the gripping devices.

DE-A1-4 320 071

This publication describes a gripping arrangement mainly consisting of two parallel gripping arms (3, 4) that can be moved towards or away from each other through controlling means. These means comprises a roller (9, 10), mounted on an axle (11, 12) and travelling in a track (14, 15), belonging to a respective gripping arm, and an angled surface (20, 21) on a respective gripping arm.

These arms can be moved away from each other through two rollers (18, 19), on a moving part, by pressing the gripping arms away from each other as the moving part moves the roller (18, 19) towards the angled surfaces, whereafter the gripping arms can be moved towards each other through a spiral spring (28) or through the coaction between further rollers (53, 54) and further angled surfaces (55, 56) as the-movable part is moved back.

DE-A1-36 420 857

This publication describes a gripping arrangement with a removable gripping jaw. The gripping jaw (2) is attached to the gripping finger through, amongst other things, a stop (14, 19) which can be secured or released with a button (7).

GB-A-2 048 212

This publication describes load handling grippers. The publication teaches that the gripping parts very easily can be manufactured and mounted in the same way as worn-out parts can be exchanged. References are made to the claim 7 of said publication in order to show that the gripper arms, being most exposed to wear-out, are exchangeable and that the number of spare parts is small. A gripping arm, where the entraining elements and the bearing pins of the two pivot bearings have identical bearing bushes, is specified in said claim 7.

U.S. Pat. No. 3 981 673

This publication describes a gripping arrangement with gripping jaws (43, 53, 63), each consisting of two parts, an upper and a lower part. The lower part is attached to the upper part through a screw (75). The lower part can easily be exchanged with another lower part with a different size or form.

The gripping jaws (43, 53, 63) form, in a closed position (FIG. 4), partly a cylinder (FIG. 2), which means that the surfaces on a respective gripping jaw, facing the adjacent gripping jaw, do not provide any space for details such as attaching screws. The screws (75) are positioned on the surface which forms the envelope surface of the cylinder formed by the gripping jaws.

U.S. Pat. No. 1 274 685

This publication describes a chuck for machine tools with movably attached gripping jaws. The gripping jaw (13) is equipped with a cylinder-formed part (12), forming a joint with the cylinder-formed space (11) in the movable part (6).

This joint makes the gripping jaw movable with a pivot axle in the horizontal plane, meaning that the gripping jaw (13) can be adjusted to an objects (4) with different cone angles.

U.S. Pat. Nos. 4 784 422 and 5 280 981

These publications describe gripping arrangements with two-parted gripping fingers where an outer part is pivotally attached to an inner part so that an adaption of the gripping surface can be made in relation to the form of the object that is to be handled.

DE-A1-3 522 983

This publication describes a gripping arrangement where a link arrangement transfers an axial movement of a piston to a radial movement of a gripping jaw.

The present invention can be regarded as a further development of the arrangement which is described in the publication U.S. Pat. No. 3 981 673.

With an arrangement where a gripping member is mounted to a partition which is in coaction with the gripping member there are various types of surfaces in coaction with each other between the member and the partition. These types of surfaces and their denominations will here be defined in order to simplify the understanding of the present invention. A supportive surface is a surface which carries a load as the gripping member is loaded and during the coaction between a gripping member and a partition. An abutment surface is a surface which does not carry a load as the gripping member is loaded and during the coaction between a gripping member and a partition.

SUMMARY OF THE INVENTION

Technical Problems

When considering the present state of the art as described above, it will be seen that in the case of an arrangement of the kind defined, having relatively small external dimensions, a technical problem resides in realizing the conditions which will be required in order to enable the movable gripping devices and/or the gripping surfaces of said devices to be easily replaced, so that worn gripping devices and/or gripping surfaces can be easily changed, and also to enable a gripping device of a first form to be quickly exchanged for a gripping device of another form when the material to be worked, or the raw material, so requires, and that not only supportive but also abutment surfaces are required for these purposes.

Another qualified technical problem is one of realizing the constructional features that are required to provide with relatively small external dimensions an adapted movement path with satisfactory force transmission for each gripping device or clamping jaw, while still enabling the gripping device and/or its gripping surface to be easily replaced or exchanged It will also be seen that a technical problem is one of realizing the directives that are required to provide conditions such that the gripping device will obtain, with a simple holding device, a satisfactory fixed relation with that part of the lever means that is intended per coaction with the gripping device.

In this regard, a technical problem also resides in proposing the use of a supportive surface belonging to said part and a through-penetrating hole, and therewith realize the significance of providing the gripping devise with a tapered portion which forms an abutment surface, and a further supportive surface which faces towards the first-mentioned supportive surface.

A technical problem also resides in realizing the significance of adapting the two supportive surfaces for supportive abutment with one another when said surfaces mutually coact, and also to provide said gripping devices with a through-penetrating hole.

It will also be seen that a technical problem resides in realizing the significance of causing the centre lines of said two holes to be mutually coordinated when the supportive surfaces are supporting and in mutual abutment, and to provide a connecting and holding element which is fixed to said part of the connecting device but readily detached therefrom and which is adapted to coact with said two holes simultaneously.

Another technical problem resides in realizing the significance of providing one of said holes with an internal screw-thread and therewith realizing the practical advantage of forming said screw-threaded hole in the gripping device.

It will also be seen that a technical problem resides in realizing the advantages that are afforded by and the significance of allowing the supportive surface of that part of the lever means intended for coaction with the gripping device to be positioned at right angles to, or at Least generally at right angles to a centre line on the centrally positioned main part, when the gripping device is in its open position.

It will also be seen that a technical problem resides in realizing the significance of and the advantages afforded by permitting the supportive surface belonging to said tapered part to be angled at a right angle and therewith readily produced by a simple material working operation.

It will also be seen that a technical problem resides in realizing the significance of and the advantages afforded by permitting said angle-form and said holes to be mutually so adapted that when a holding means is inserted, the gripping device will be latched against rotary movement around said holding means, said means advantageously having the form of a screw.

It will also be seen that a further technical problem is one of realizing the advantages that are afforded when the greatest length of the angle-form of the supportive surface is orientated at right angles to said centre line, and when a smaller length is directed away from the gripping surface of said gripping device, and therewith permit the hole to be edge-related within a rectangle formed by said supportive surfaces as two adjacent sides.

It will also be understood that a technical problem is one of creating conditions whereby different gripping devices may exist as individual units, and that at least one gripping device can be given the form of a claw.

With regard to this embodiment, it will be seen that a technical problem resides in realizing the significance of providing conditions with the aid of simple means such that the gripping surface of the gripping device will be located centrally to a plane or surface related to said tapering part and an abutment surface formed by said plane or surface.

It will also be seen that a technical problem is one of creating such conditions and to provide such structural details, while offering relatively small external dimensions, as to enable the use of three gripping devices which can be positioned symmetrically around said main part, and to position the requisite pivot axles axially far from the gripping surfaces relative to the piston-cylinder device.

It will also be seen that a technical problem is one of creating conditions such that the pivot axles of the lever means used, one such arrangement for each gripping will will be positioned closer to the piston-cylinder device than the gripping surfaces of said gripping devices, and that the structure adjacent the gripping devices requires a conical end surface herefor.

It will also be seen that a technical problem resides in creating conditions whereby in the fully open position of the gripping devices the axial distance between a gripping surface and its pivot axis will be as large as is practically possible, and at least above 15 mm, such as from 20 to 40 mm.

It will also be seen that a technical problem resides in creating in an arrangement of the aforesaid kind conditions whereby the pivot axles of respective lever means can be located close to the centre line of said main part and whereby the part that is intended for coaction with the piston-cylinder device and the part that is intended for coaction with the gripping device are located as far away as possible from said centre line.

It will also be seen that a technical problem is one of realizing the significance of permitting an action point between the piston-cylinder device and the lever means to pass radially over the pivot axle of the lever means upon movement between selected end positions.

It will also be seen that with a construction of the afore-described kind a technical problem resides in realizing the measures and the dimensioning required to permit the gripping surfaces of each gripping device used to move in a coordinated arcuate path between selected end positions.

Solution

With the intention of solving one or more of the aforesaid technical problems, the present invention takes as its starting point an arrangement which grips and holds or releases material with the aid of a number of movable gripping devices and which includes a central, axially extending main part which is adapted to support a piston-cylinder device which can move reciprocatingly in relation to said main part, wherein the axial movement of said piston-cylinder device can be translated to radial movement of said gripping devices through the medium of a lever means, and wherein the lever means is pivotal in relation to said main part and has a part which is intended for coaction with the piston-cylinder device and a part which is intended for coaction with the gripping device.

In accordance with the present invention, the part that is intended for coaction with the gripping device includes a first supportive surface and a first through-penetrating hole, and the gripping device includes a tapered portion which forms an abutment surface, and a second supportive surface which can face towards the first supportive surface, wherein the two supportive surfaces are adapted to abut and support one another, wherein said gripping devices include a second through-penetrating hole, wherein when the supportive surfaces support and abut one another the centre lines of said two holes are coordinated, and wherein a connecting and holding element is fixed to but readily removable from said gripping device part and is intended to coact with said holes simultaneously.

According to proposed embodiments that lie within the scope of the inventive concept, one of said two holes shall have an internal screw thread and the screw-threaded hole is preferably formed in the gripping device.

It is also proposed that a first supportive surface on the part intended for coaction with the gripping device is positioned perpendicularly, or at least essentially perpendicularly, to a centre line of the centrally positioned main part when the gripping device is in its open position.

It is also proposed in accordance with the invention that the second supportive surface of the tapered part has an angle-form and that said angle-form and said holes are mutually so adapted as to enable a holding element to be inserted therein so as to latch the gripping device against rotary movement about said element.

According to one embodiment of the invention, the gripping devices are three in number and are positioned symmetrically around the main part in a known manner, with the pivot axle of respective lever means being located closer to the piston-cylinder device than the gripping surfaces of the gripping devices.

It is also proposed that when the gripping devices are open, the axial distance between a gripping surface and an associated pivot axle will be greater than 15 mm, such as 20 to 40 mm, in a direction towards the piston-cylinder device.

It is also proposed that in the case of a CNC lathe, it shall be possible to activate the piston-cylinder device by coolant pressure.

It is also proposed that the pivot axles of the lever means are located close to the centre line of the aforesaid main part, with the part intended for coaction with the piston-cylinder device and the part intended for coaction with the gripping device being located remote from said centre line.

It is also proposed that upon movement between selected end positions, the action point between the piston-cylinder device and each lever means will move radially over the pivot axle of the lever means through a distance slightly more than roughly half the movement path.

It is also proposed that the gripping device and its gripping surface are adapted to move arcuately between said selected end positions.

Advantages

Those advantages primarily afforded by an inventive arrangement reside in the provision of conditions which enable gripping devices and/or gripping surfaces to be readily exchanged or replaced and different types of gripping devices to be used, wherein the gripping device or an intermediate part shall include a tapered portion for coaction with the lever means through the medium of one single connecting and holding element which is fixed but readily removed and which is intended to coact with a hole in the gripping device and a hole in the lever means such as to fix the gripping device in relation to said lever means. This provides a readily exchanged or replaced gripping element and/or gripping surface, even when the external dimensions of the arrangement are relatively small.

BRIEF DESCRIPTION OF THE DRAWINGS

The invention will now be described in more detail with reference to exemplifying embodiments thereof at present preferred and with reference to the application of said arrangement and to the accompanying drawings, in which.

DESCRIPTION OF EMBODIMENTS AT PRESENT PREFERRED

Figure 1:
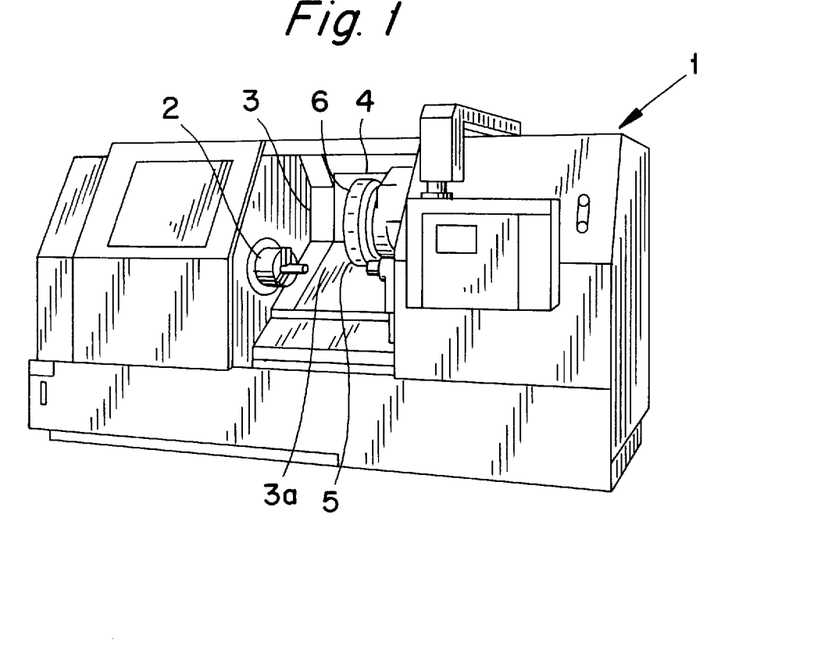
FIG. 1 is a perspective view of a program-controlled machine tool in the form of a CNC lathe.

FIG. 1 is a perspective view of a numerically controlled machine tool in the form of a CNC lathe 1 which includes a raw-material holding device in the form of a chuck 2 by means of which raw material to be machined can be held firmly, or released. The raw material 3 may have a rough unworked peripheral surface or a machined surface.

The raw material 3 will normally be rod material.

The raw material 3 is loosened when the clamping jaws 2a of the chuck 2 are open and will be held firmly in the chuck when the clamping jaws 2a are closed.

The lathe 1 of the illustrated embodiment includes a tool holder 4 which is intended to hold a plurality of tool devices, the tool device chosen being dependent, among other things, on the configuration and surface structure of the workpiece 3a to be machined.

The holder 4 may advantageously consist of a unit of this kind referred to as a tool revolver.

The raw material may be machined with one of a number of exchangeable tool devices. One such tool device 5 may comprise a stem or an attachment and a twist drill. The illustrated machine tool also includes, in accordance with the invention, a fixed tool device which comprises an arrangement 6 for gripping and loosening a machined workpiece or raw material.

Figure 2:
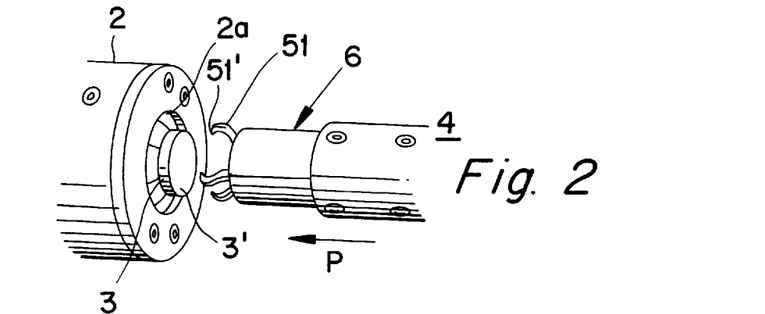
FIG. 2 is a perspective view of an inventive gripping arrangement with the gripping devices shown in an open position and prepared for gripping material held in a chuck.
Figure 3:
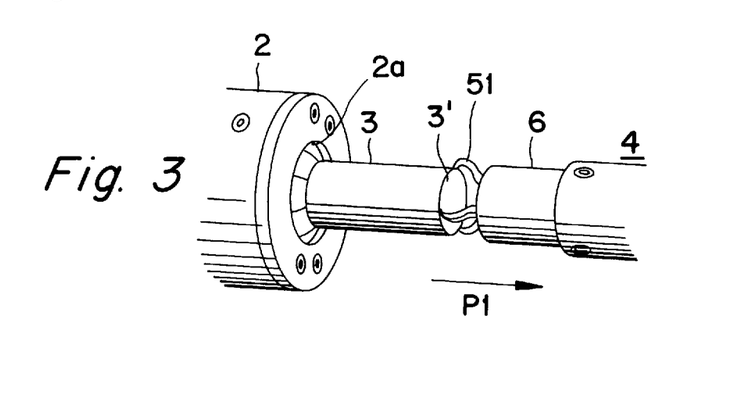
FIG. 3 is a perspective view in which the material has been gripped by the gripping arrangement and drawn forwards to a machining position.

FIG. 2 illustrates an inventive arrangement 6 in a fully open position with regard to the three gripping devices 51. Axial movement of the device 6 in the direction of the arrow P will bring the gripping surfaces 51' of the gripping devices 51 into coaction with an outer edge-related surface 3' of the material 3, by virtue of the gripping devices 51 being caused to clamp around the surface 3'. When the chuck jaws 2a are open and the arrangement 6 is moved axially in the direction of the arrow P1, the arrangement functions to draw the material 3 out of t-he chuck 2 to the position shown in FIG. 3, whereafter the chuck jaws 2a are caused to clamp around the material 3 so that the material can be machined after first having removed the arrangement 6 from the position shown in FIG. 3. It will be understood that the actual machining of the workpiece lies outside the principles of the invention.

Figure 4:
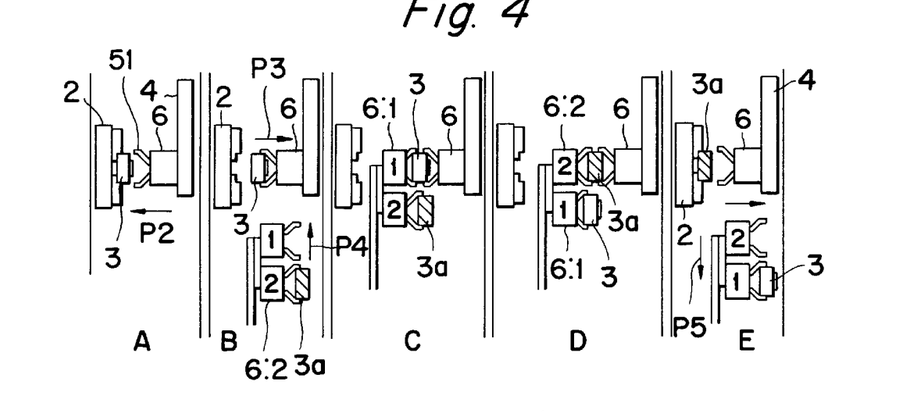
FIG. 4 shows in five different sequences A–E the manner in which three mutually identical inventive arrangements can be caused to coact in performing a robot function.

FIG. 4 illustrates a sequence of five different positions A–E where three inventive arrangements 6, 6:1, 6:2 are able to coact to provide a robot function.

FIG. 4A shows an inventive arrangement 6 attached to a holder 4 and brought by known means (not shown) to a position adjacent a chuck 2, therewith enabling the gripping devices 51 to grip the material 3.

This requires movement in the direction of the arrow P2, among other things.

In FIG. 4B, the material 3 has been gripped by the arrangement 6 and moved axially in the direction of the arrow P3 through an adapted distance away from the chuck 2.

FIG. 4B also illustrates the use of two further inventive arrangements referenced 6:1, 6:2, of which the arrangement 6:2 supports material 3a to be machined in a later stage.

This requires movement in the direction of the arrow P4, among other things.

FIG. 4C shows the arrangement 6:1 moved in the direction P4 and therewith brought to a position in which the arrangement is able to grip the machined material 3, whereafter the arrangement 6 releases its coaction with the material 3.

FIG. 4D illustrates the arrangement 6:1 and 6:2 in another position (rotated through 180°) and the arrangement 6:2 positioned for machining the material 3a, so that the arrangement 6 is able to grip the material 3a, whereafter the arrangements 6:1, 6:2 are moved away in the direction of the arrow P5 in accordance with FIG. 4E, so that the arrangement 6 can again bring the fresh material 3a into coaction with the chuck 2.

Figure 5:
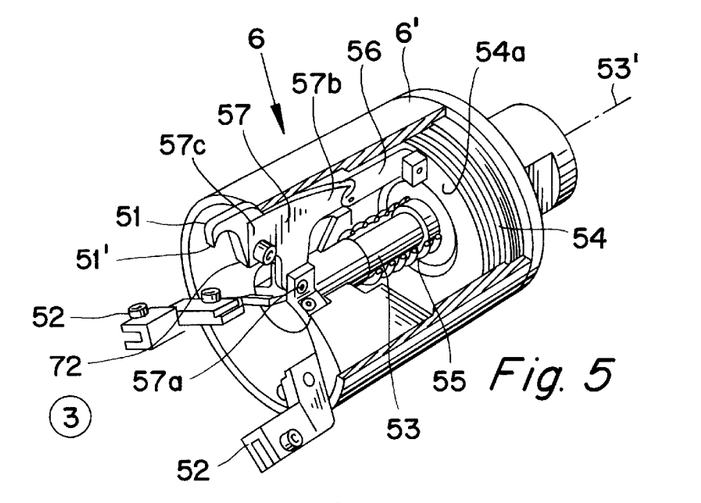
FIG. 5 is a perspective view, partially in section, of the inventive arrangement with the gripping devices in a fully open position.

FIG. 5 is a perspective view, partially in section, of an arrangement 6 constructed in accordance with the inventive principle.

The arrangement 6 includes a number of movable gripping devices 51, 52 which function to grip and hold or release material 3 (not shown in FIG. 5).

The arrangement 6 includes a centrally positioned and axially extending main part 53 which is adapted to carry a piston-cylinder device 54 which is reciprocatingly movable in relation to the main part 53 and which has a reciprocatingly movable piston 54a which is urged or pressed to the position shown in FIG. 5 with the aid of a spring 55.

Axial movement of the piston 54a within a tubular sleeve 6 is translatable to related radial movement of the gripping devices 51, through the medium of a lever means 57.

The lever means 57 is mounted on a pivot axle 57a for pivotal movement in relation to said main part and includes a part 57b intended or coaction with the piston-cylinder device and a part 57c intended for coaction with the gripping device 51.

Figure 6:
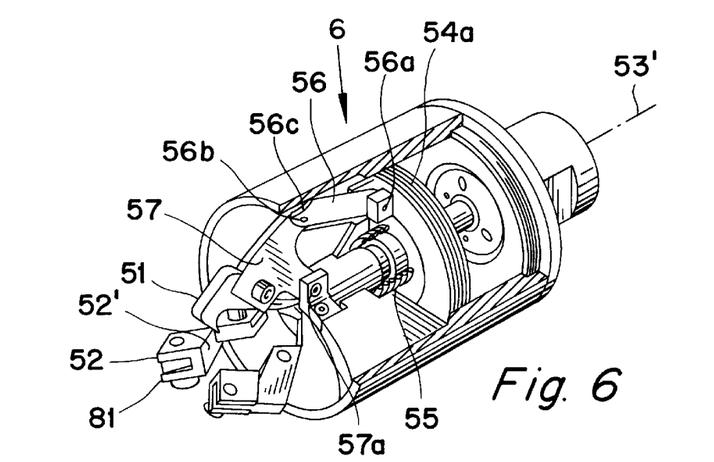
FIG. 6 is a perspective view, partially in section, of the arrangement shown in FIG. 5 with the gripping devices in a fully closed position.

The invention provides the possibility of readily exchanging or replacing the gripping devices and/or gripping surfaces, and to this end the embodiments illustrated in FIGS. 5 and 6 illustrate a first embodiment of a gripping device 51 which is shown fitted to the lever means 57, and a second embodiment of a gripping device 52 which is shown fitted to the two remaining lever means.

These will be described in more detail below with reference to FIGS. 7 and 8.

It is mentioned here, however, that the most beneficial embodiment and the most frequently occurring embodiment is one in which all three lever means are caused to coact with similar gripping devices, although the embodiment illustrated in FIGS. 5 and 6 may be more appropriate in special applications.

Corresponding to the FIG. 5 illustration, FIG. 6 is a sectional view of the arrangement 6, although in this case the piston 54a is shown in a position in which the gripping devices are closer together.

The respective illustrations of FIG. 5 and FIG. 6 can be said to illustrate movement of the gripping devices 51 and 52 between end positions.

FIG. 6 shows the lever means 57 rotated about its pivot point 57a by means of a link rod or link arm 56.

The link arm 56 is connected pivotally to the piston 54a by means of a pivot axle 56a, and is pivotally connected to the lever means 57 by means of a pivot axle 56b.

Figure 7:
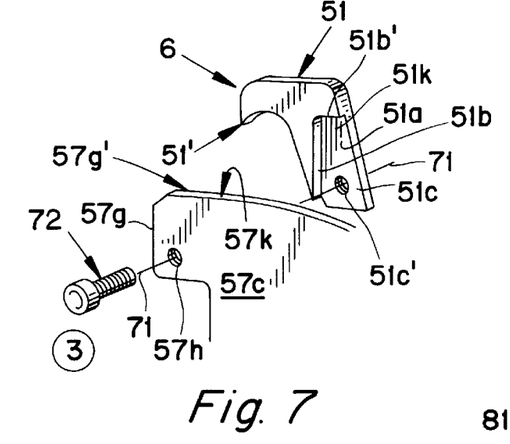
FIG. 7 is a perspective view which illustrates the principle in which a gripping device provided with a claw-like gripping surface is fitted to the lever means.

FIG. 7 shows that the part 57c of the lever means 57 that is intended for coaction with the gripping device includes a first load carrying supportive surface 57g and a first through-penetrating hole 57h.

Also shown is a second supportive surface 57g' which forms a right angle with said first supportive surface 57g.

The part 57c also has a non-load carrying flat abutment surface 57k for a gripping device 51.

The gripping device 51 has a part 51a which is tapered to half the thickness and which provides a second supportive surface 51b which can face towards the first supportive surface 57g, and a supportive surface 51b' which can face towards the supportive surface 57g', and a flat abutment surface 51k.

The two supportive surfaces 51g and 51b are able to abut and support one another, and the two further supportive surfaces 57g' and 51b' are also able to abut and support one another.

The abutment surfaces 51k and 57k are intended to abut one another.

The gripping devices 51 include a second through-penetrating hole 51c.

When the supportive surfaces 57g, 51b abut one another, the centre lines 71 of the two holes will be coordinated and a connecting and holding element 72 fixed to said part of the gripping device but readily removable there from is intended to coact with said holes 57h and 51c simultaneously.

According to the invention, one of said holes has an internal screw-thread, and it is proposed here that the screw-threaded hole is provided in the gripping device 51. The screw-thread is referenced 51c'.

The first supportive surface 57g on the part 57c intended to coact with the gripping device is positioned at right angles to a centre line 53' allocated to the centrally positioned main part 53, when the gripping device 51 is in its fully open position.

The second supportive surface 51b on the narrowed part 51a is angled at right angles to a further supportive surface 51b'.

The angle-shape 51b, 51b' and the second hole 51c are adapted so that when a holding device 72 is inserted, the gripping device 51 will be latched against rotation about said element 72 in an anti-clockwise direction.

The element 72 has the form of a screw.

The second hole 51c is located within the narrowed part 51a, so that the second supportive surface, 51b and 51b' respectively, will lock against the first supportive surface, 57g and 57g' respectively, and as far away from the surface 51b' as is possible in practice.

In the FIG. 7 embodiment, the gripping surface 51' of the gripping device has the form of a claw which includes an edge or tip located centrally of a plane or surface 51k on the narrowed part 51a.

In the case of the FIG. 7 embodiment, the surface 5ib' and the point or tip 51' are located mutually at roughly the same vertical distance from the second hole 51c, although it lies within the scope of the invention for the distance to the point 51' to be greater and even much greater than that shown in FIG. 7, when needing to grip material 3 of larger dimension than the Dimension shown in the FIG. 7 embodiment. Reference is made in this regard to the broken line (51) in FIG. 9.

Figure 8:
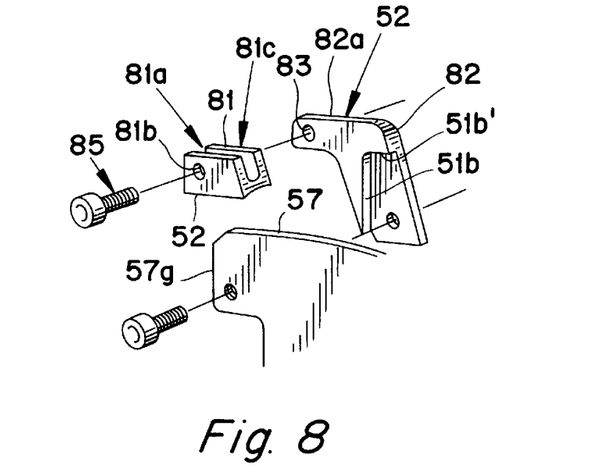
FIG. 8 is a perspective view which illustrates the principle in which a gripping device comprising an intermediate part and a gripping surface in the form of a separate unit is fitted to the lever means; and, FIG. 9 is a sectioned view of part of the arrangement in the state or position shown in FIG. 5, said Figure also showing gripping devices of mutually different size.

As will also be seen from FIG. 8, the gripping surface 52' of the gripping device 52 has the form of a unit 81 which is pivotally mounted to an intermediate part 82 of the gripping device.

Similar to what is shown in FIG. 7, the intermediate pert 82 includes a second supportive surface 51b and a supportive surface 51b' which are intended for coaction with the first supportive surface 57g and the supportive surface 57g' respectively, and the free-end 82a of the intermediate part 82 has a hole 83 provided therein.

The part 81 is provided with a central slot 81a and a flat gripping surface 52' on the unit 81 can be set to a chosen setting by means of a fixed but easily removed connecting and holding element 85, wherein the illustrated position is relative to the direction of the centre line 53'.

The part 81 includes a hole 81b and a screw-threaded hole 81c, and the hole 83 is adapted for through-passage of the screw 85.

The legs provided by the part 81 can hereby be clamped securely to the part 82 and the positional setting of the surface 52' can be chosen in accordance with the shape of the material 3.

The part 81 can be shaped from a plastic material, in which case the screw-threaded hole will be preferably formed in a metal intermediate part 82.

Figure 9:
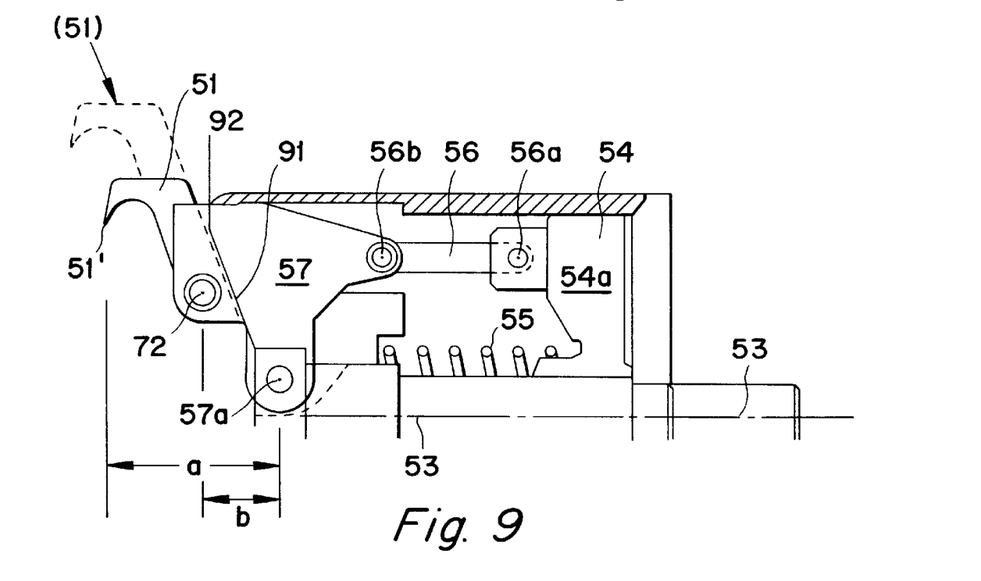

As will be seen more clearly from FIG. 9, the pivot axle 57a of the lever means 57 is placed closer to, the piston-cylinder device 54 than is the gripping surface 51' of the gripping device.

As will seen from FIGS. 5 and 9, the axial distance (a) between the gripping surface 51' and the pivot axle 57a is more than 15 mm, such as 35 mm, when the gripping devices are open.

It is also shown that a conical surface 91 is adapted to accommodate both the connecting and holding element 72 and a part of the lever means 57, such as to allow the pivot axle of said lever means to be located close to the apex of the cone.

The element 72 is located adjacent to and possibly only slightly outside a plane 92 and roughly half the distance from the centre line 53'.

The axial distance (b) between the element 72 and the pivot axle 57a is chosen to be between 10 and 20 mm, in the illustrated case 15 mm.

The pivot shafts 57a of the three lever means 57 are located close to the centre line 53' of the main part and with the first part intended for coaction with the piston-cylinder device and with the second part intended for coaction with the gripping device located remote from said centre line.

FIG. 9 also shows that the action point 56b is located slightly further from the centre line 53' in a radial direction than the element 72 and closer to the centre line 53' than the gripping surface 51'.

The action point 56b between the piston-cylinder device and the lever means passes radially over the pivot axle 57a of the lever means within the terminating part of movement between selected end positions. Each gripping device 51 is therewith able to move in an arcuate path between selected end positions.

With regard to the link arm 56, the link arm is provided with a bevelled surface in relation to the pivot axle 56b, so as to be able to come close to the inner surface part of the casing. The bevelled surface is referenced 56c.

For the sake of simplicity, the surface 52' has been shown in FIG. 6 inclined to the centre line 53', so as to adapt to an inclined surface of the machined material 3. When the machined material has a cylindrical outer surface, the angular position is adjusted accordingly while, at the same time, the surface 52' can be curved for abutment with the outer surface of the workpiece 3.

It will be understood that the invention is not restricted to the aforedescribed and illustrated exemplifying embodiments thereof and that modifications can be made within the scope of the inventive concept as defined in the following claims.

What is claimed is:

1. An arrangement which grips and holds or releases material with the aid of a number of movable gripping devices and which includes a central, axially extending main part which is adapted to support a piston-cylinder device which can move reciprocatingly in relation to said main part, wherein the axial movement of said piston-cylinder device can be translated to radial movement of said gripping devices through the medium of a lever means, and wherein the lever means is pivotal in relation to said main part and has a part which is intended for coaction with the piston-cylinder device and a part, which is intended for coaction with the gripping device and which includes a first supportive surface and a first through-penetrating hole, and where said gripping device includes a second supportive surface and a second through-penetrating hole, characterized in, that the gripping device includes a tapered portion which forms, among other things, said second supportive surface and a first abutment surface, that said two supportive surfaces can face towards one another and perpendicularly related to a plane, which is adapted to coincide with a centre line of said main part, that said first supportive surface is parallel related to said plane, that said part includes a second abutment surface, which can face said first abutment surface, that said two abutment surfaces are adapted to abut and support one another, that said first hole is positioned through said second abutment surface, that said second hole is positioned through said first abutment surface, that when the supportive surfaces support and abut one another the centre lines; of said two holes are coordinated, and that a connecting and holding element is fixed to but readily removable from said gripping device part and is intended to coact with said two holes simultaneously.

2. An arrangement according to claim 1, characterized in that one of said holes has an internal screw-thread.

3. An arrangement according to claim 2, characterized in that the screw-threaded hole is provided in the gripping device.

4. An arrangement according to claim 1, characterized in that the screw-threaded hole is provided in the gripping device.

5. An arrangement according to claim 1, characterized in that said first supportive surface on the part intended for coaction with the gripping device is positioned perpendicularly, or at least essentially perpendicularly, to a centre line of the centrally positioned main part when the gripping device is in its open position.

6. An arrangement according to claim 1, characterized in that the second supportive surface belonging to the narrowed part is angled.

7. An arrangement according to claim 6, characterized in that the angle-form and said second hole are mutually so adapted that when a holding member is inserted, the gripping device is latched against rotary movement about said holding member.

8. An arrangement according to claim 1, characterized in that the angle-form and said second hole mutually so adapted that when a holding member is inserted, the gripping device is latched against rotary movement about said holding member.

9. An arrangement according to claim 8, characterized in that said member is a screw.

10. An arrangement according to claim 1, characterized in that said member is a screw.

11. An arrangement according to claim 1, characterized in that the gripping device has a claw-shaped gripping surface.

12. An arrangement according to claim 11, characterized in that the gripping surface of said gripping device is located centrally on a surface on the narrow part.

13. An arrangement according to claim 1, characterized in that the gripping surface of said gripping device is located centrally on a surface on the narrowed part.

14. An arrangement according to claim 1, characterized in that the gripping devices are three in number and positioned symmetrically around the main part.

15. An arrangement according to claim 14, characterized in that the pivot axle of the lever means is positioned closer to the piston-cylinder device than the gripping surfaces on the gripping devices.

16. An arrangement according to claim 14, characterized in that the pivot axles of the lever means are located close to the centre line of the main part; and in that the part intended for coaction with the piston-cylinder device and the part intended for coaction with the gripping device are positioned remote from said centre line.

17. An arrangement according to claim 1, characterized in that the pivot axle of the lever means is positioned closer to the piston-cylinder device than the gripping surfaces on the gripping devices.

18. An arrangement according to claim 11, characterized in that when the gripping devices are open, the axial distance is above 15 mm.

19. An arrangement according to claim 1, characterized in that the piston-cylinder device is activatable by coolant pressure when the arrangement is included in a CNC lathe.

20. An arrangement according to claim 1, characterized in that the pivot axles of the lever means are located close to the centre line of the main part; and in that the part intended for coaction with the piston-cylinder device and the part intended for coaction with the gripping device are positioned remote from said centre line.

21. An arrangement according to claim 20, characterized in that the action point between the piston-cylinder device and the lever means pass radially over the pivot axle of the lever means when moving between chosen end positions.

22. An arrangement according to claim 1, characterized in that the action point between the piston-cylinder device and the lever means pass radially over the pivot axle of the lever means when moving between chosen end positions.

23. An arrangement according to claim 1, characterized in that the gripping device is arranged to move arcuately between chosen end positions.

24. An arrangement according to claim 1, characterized in that the devices are positioned adjacent a conical surface.

25. An arrangement according to claim 24, characterized in that the axial distance between said device and a pivot axle of the lever means is about 15 mm.

26. An arrangement according to claim 24, characterized in that said device is located slightly outside a plane assigned to the largest diameter of the conical surface.

* * * * *